(No Model.)

G. HART.
CONNECTOR FOR STORAGE BATTERY PLATES.

No. 605,424. Patented June 7, 1898.

Witnesses.
Robert Emmett,
Bruce S. Elliott.

Inventor.
Gilbert Hart,
By James L. Norris.
Atty.

UNITED STATES PATENT OFFICE.

GILBERT HART, OF DETROIT, MICHIGAN.

CONNECTOR FOR STORAGE-BATTERY PLATES.

SPECIFICATION forming part of Letters Patent No. 605,424, dated June 7, 1898.

Application filed January 13, 1898. Serial No. 666,536. (No model.)

*To all whom it may concern:*

Be it known that I, GILBERT HART, a citizen of the United States, residing at Detroit, in the county of Wayne and State of Michigan, have invented new and useful Improvements in Connectors for Storage-Battery Plates, of which the following is a specification.

This invention relates to secondary or storage batteries, wherein electrodes are arranged in cells or vessels and connectors are employed for connecting the electrodes of one group of battery-plates with the electrodes of another group of battery-plates.

The chief object of the present invention is to provide novel, simple, substantial, and effective means for connecting the electrodes of one group of battery-plates with the electrodes of another group of such plates. To accomplish this object, my invention consists, essentially, in the combination of an insulating base-bar, a lead or metallic plate superimposed upon said base-bar, connector-plates alternately extending in opposite directions and resting at one end upon the lead or metallic plate, which is supported by the insulating base-bar, and screws passing through the connector-plates and the superimposed lead or metallic plate into the insulating base-bar, whereby the connector-plates are detachably secured in position and a strong and substantial structure is provided which is advantageous over that type of connectors wherein the connector-plates are constructed to enter sockets or mercury-cups in a lead or metallic plate interposed between two cells or vessels containing battery-plates.

The invention also consists in certain other features of construction and combination or arrangement of parts hereinafter described and claimed, reference being made to the accompanying drawings, in which—

Figure 1:
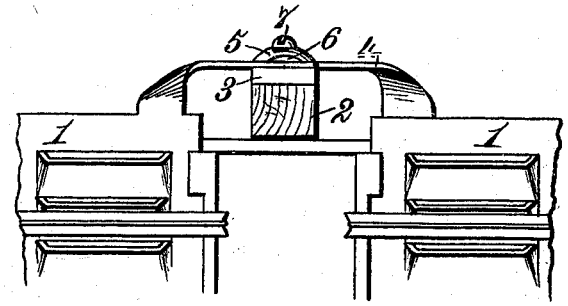
Figure 2:
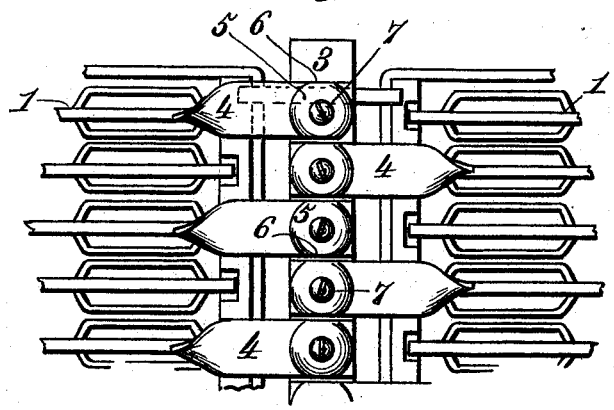
Figure 3:
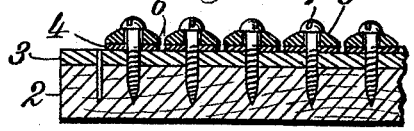

Figure 1 is a broken side elevation showing my invention in connection with the electrodes or cell-plates of a secondary or storage battery. Fig. 2 is a plan view of the same, and Fig. 3 is a longitudinal sectional view through the insulating base-bar to illustrate the manner in which the connector-plates are secured to the lead or metallic plate which is superimposed upon the said insulating base-bar.

In order to enable those skilled in the art to make and use my invention, I will now describe the same in detail, referring to the drawings, wherein the numerals 1 indicate electrodes arranged in groups and designed to be placed in cell cases or vessels, which contain the electrolytic fluid, as usual. The electrodes or cell-plates may be of any construction suitable for the purpose in hand. An insulating base-bar 2 is located between two adjacent cells or vessels containing the electrodes and the electrolytic fluid, and this bar is composed of a rectangular block of wood, hard rubber, or vulcanite, preferably of hard rubber. On the upper side of this insulating base-bar is superimposed a lead or metallic plate 3 of a thickness considerably less than the thickness or height of the base-bar. The length and width of the lead or metallic plate 3 are substantially the same as the length and width of the insulating base-bar. The connectors 4 are composed of lead plates and serve to connect one group of electrodes with another group. The connectors alternately extend in opposite directions from the lead or metallic plate 3 and at one end rest directly upon the superimposed lead or metallic plate 3, and upon such ends of the connector-plates are placed lead or metallic washers 5, preferably constructed with flat under sides and convex upper sides. The washers are each cut away at opposite sides, as at 6, so that the connector-plates and the washers can be brought closely together, and at the same time the washers are of a width equal to the width of the connector-plates and afford very extended bearings to rest upon the connector-plates. The washers, the connector-plates, and the superimposed lead or metallic plate are constructed with orifices for the passage of screws 7, which may be ordinary metal screws or be composed of hard rubber or vulcanite. The screws enter the base-bar and serve to rigidly but detachably clamp the connector-plates and the superimposed lead or metallic plate firmly upon the upper side of the insulating base-bar, whereby a strong and substantial structure is obtained, and the several parts comprising the battery-plate connector can be readily separated, if occasion should demand, and be readily reassembled for operation. The outer ends of the connector-plates may connect with the battery-plates in any manner suitable for the purpose in hand.

Having thus described my invention, what I claim is—

1. In a connector for storage-battery plates, the combination of an insulating base-bar, a lead or metallic plate superimposed upon the said base-bar, connector-plates alternately extending in opposite directions and resting at one end upon the lead or metallic plate, and screws passing through the connector-plates and the superimposed lead or metallic plate into the insulating base-bar, substantially as described.

2. In a connector for storage-battery plates, the combination of an insulating base-bar, a lead or metallic plate superimposed upon said base-bar, connector-plates alternately extending in opposite directions and resting at one end upon the lead or metallic plate, washers arranged upon the ends of the connector-plates which rest on the lead or metallic plate, and screws passing through the washers, the connector-plates and the lead or metallic plate into the insulating base-bar, substantially as and for the purposes described.

In testimony whereof I have hereunto set my hand in presence of two subscribing witnesses.

GILBERT HART.

Witnesses:
FRANK H. WHELDEN,
THOMAS V. DUTTON.